United States Patent
Lee et al.

(10) Patent No.: US 7,009,927 B2
(45) Date of Patent: Mar. 7, 2006

(54) METHOD OF RECORDING OR REPRODUCING DATA ON OR FROM HIGH DENSITY MULTI-LAYER RECORDING MEDIUM USING VARIABLE LIGHT INTENSITY

(75) Inventors: Kyung-geun Lee, Gyeonggi-do (KR); In-sik Park, Gyeonggi-do (KR); In-oh Hwang, Gyeonggi-do (KR); Chang-min Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 10/026,658

(22) Filed: Dec. 27, 2001

(65) Prior Publication Data

US 2002/0122368 A1   Sep. 5, 2002

(30) Foreign Application Priority Data

Dec. 28, 2000  (KR) .............................. 2000-84213

(51) Int. Cl.
  *G11B 7/20* (2006.01)
(52) U.S. Cl. ....................... 369/94; 369/47.5
(58) Field of Classification Search ............. 369/47.5, 369/47.51, 47.52, 53.26, 53.27, 94
See application file for complete search history.

(56) References Cited

U.S. PATENT DOCUMENTS 5,756,265 A  *  5/1998  Abe et al. .................. 430/321

FOREIGN PATENT DOCUMENTS

| JP | 8-96406 | 4/1996 |
|---|---|---|
| JP | 2000-285469 | 10/2000 |
| JP | 2002-133667 | 5/2002 |
| JP | 2002-133714 | 5/2002 |

OTHER PUBLICATIONS

Japanese Office Action dated Aug. 10, 2004.

* cited by examiner

*Primary Examiner*—Paul W. Huber
(74) *Attorney, Agent, or Firm*—Stein, McEwen & Bui, LLP

(57) ABSTRACT

A high-density optical recording medium and method of recording data on the optical recording medium. The optical recording medium includes a plurality of data recording/reproducing surfaces having reflectances for light passing through a pit area, a land/groove area, and a land/groove area on which data are recorded, of a data recording/reproducing surface included between a light source for emitting light and a recording/reproducing surface selected from the plurality of data recording/reproducing surfaces, the reflectances satisfy the expressions $r1 \geq r2 \geq r3$ and $\{(r1-r3)/r3\} \leq 0.2$, where r1, r2 and r3 are the reflectances of the pit area, the land/groove area and the land groove area on which data are recorded, respectively.

5 Claims, 4 Drawing Sheets

METHOD OF RECORDING OR REPRODUCING DATA ON OR FROM HIGH DENSITY MULTI-LAYER RECORDING MEDIUM USING VARIABLE LIGHT INTENSITY

CROSS REFERENCE TO RELATED APPLICATIONS

This application claims the benefit of Korean Application No. 2000-84213 filed Dec. 28, 2000, in the Korean Patent Office, the disclosure of which is incorporated herein by reference.

BACKGROUND OF THE INVENTION

1. Field of the Invention

The present invention relates to an optical recording medium for storing a high-density of data and a method of recording data on the optical recording medium.

2. Description of the Related Art

In general, data are read and recorded on an optical recording medium by an optical pickup device using a non-contact method. Types of optical recording media include a compact disc (CD) and a digital versatile disc (DVD). These optical recording media are distinguishable by data recording capacity, although a diameter and a thickness of each of the recording media are the same at 12 cm and 1.2 mm, respectively. Thus, an external structure of the CD and the DVD are the same.

The data recording capacity of the DVD is larger than the data recording capacity of the CD even though the appearance and size of the DVD are the same as the appearance and size of the CD. This is achieved by internal features of the DVD which are different from internal features of the CD. The different internal features include a data recording standard, a thickness of a substrate on which data are recorded, a track pitch, and a minimum size of a pit.

The standard for recording data onto a DVD is stricter than the standard for recording data onto a CD and a wavelength of a light source for reading and recording data is shorter for the DVD than for the CD.

As an amount of data to be recorded on a recording medium increases due to an emergence of a new information transmission medium, for example, high-definition (HD) TV, increased data recording capacity is required of the DVD. To meet this requirement, a DVD having increased data recording capacity has emerged, for example, a DVD having a plurality of recording surfaces.

In detail, FIGS. 1A, 1B and 1C show a DVD according to prior art which includes first and second information substrates 111 and 121, on which information signals are recorded on surfaces of each of the substrates 111 and 121, and a third information substrate 131, arranged between the first information substrate 111 and the second information substrate 121, on which information signals are recorded on both surfaces of the substrate 131. The first information substrate 111 includes a first incident surface 111a through which light L for recording/reproducing is transmitted and a first recording surface 111b on which an information signal is recorded. A first reflective layer 113, which reflects some incident light and transmits a remainder of the incident light, is formed on the first recording surface 111b. A first recording layer 115 on which an information signal is recorded and a second reflective layer 117, which is formed on the first recording layer 115 and reflects some of the incident light, are formed on the first reflective layer 113.

A second information substrate 121 includes a second incident surface 121a through which the light L for recording/reproducing is transmitted and a second recording surface 121b on which an information signal is recorded. A third reflective layer 123 which reflects some of the incident light is formed on the second recording surface 121b. A second recording layer 125 on which an information signal is recorded and a fourth reflective layer 127, which is formed on the second recording layer 125 and reflects some of the incident light, are formed on the third reflective layer 123.

A third information substrate 131 is bonded to and formed between the second reflective layer 117 and the fourth reflective layer 127. The third information substrate 131 includes a third recording surface 131a on which an information signal is recorded/reproduced by light transmitted through the first and second reflective layers 113 and 117, and includes a fourth recording surface 131b on which an information signal is recorded/reproduced by light transmitted through the third and fourth reflective layers 123 and 127.

In this way, in a case where two or more data recording surfaces are sequentially formed on a surface, assuming that the data recording surfaces are represented as L0, L1, L2, ... LN in order starting with the data recording surface closest to the light source, a laser for recording or reading must be transmitted through L0 when data are to be recorded on L1 or when data recorded on L1 are read. The laser for recording or reading may be influenced by the physical structure of L0, for example, a pit, a groove, or a groove having a mark as a data recording. For example, as the laser is diffracted by the physical structure of L0 which is in the path of the laser, the strength of the laser reaching L1 is thereby varied. As a result, the quantity of light reflected from L1 is different from the quantity of light reflected where the laser is not diffracted, and reading data recorded on L1 correctly becomes impossible. Also, in a case where the laser is used for recording, the intensity of the laser after passing through L0 is lower than a critical intensity required for recording. As a result, data may not be recorded correctly, or data, which are different from original data (incorrect data), may be recorded.

SUMMARY OF THE INVENTION

To solve the above problem, it is a first object of the present invention to provide an optical recording medium having a plurality of data recording/reproducing surfaces in which recording and reproducing properties are not diminished.

It is a second object of the present invention to provide a method for recording and reproducing data on an optical recording medium having a plurality of data recording surfaces.

Additional objects and advantages of the invention will be set forth in part in the description which follows, and, in part, will be obvious from the description, or may be learned by practice of the invention.

Accordingly, to achieve the first object and other objects of the invention, there is provided an optical recording medium comprising a plurality of data recording/reproducing surfaces having reflectances for light passing through a pit area, a land/groove area, and a land/groove area on which data are recorded, of a data recording/reproducing surface included between a light source for emitting light and a recording/reproducing surface selected from the plurality of data recording/reproducing surfaces, the reflectances satisfy the expressions: $r1 \geq r2 \geq r3$ and $\{(r1-r3)/r1\} \leq 0.2$, where the reflectances of light incident on an area of the data recording/reproducing surface selected from the plurality of data recording/reproducing surfaces are represented as r1, r2, and r3.

Preferably, the selected area is a pit area, a land/groove area, or a land/groove area on which data are recorded, and the recording medium comprises first and second information substrates each having the plurality of data recording/reproducing surfaces, and a translucent bonding layer included between the first and second substrates which bonds the first and second information substrates so that the plurality of data recording/reproducing surfaces included on the first substrate faces the plurality of data recording surfaces included on the second information substrate. Alternatively, the medium comprises first and second information substrates, each having the plurality of data recording/reproducing surfaces, and an opaque bonding layer included between the substrates for bonding the first and second information substrates so that the plurality of data recording/reproducing surfaces included on the first substrate faces opposite the plurality of data recording surfaces included on the second information substrate.

To achieve the second object and other objects of the invention, there is provided a method for recording and reproducing data on an optical recording medium. The optical recording medium has a plurality of data recording/reproducing surfaces, in which data are recorded or reproduced on a next recording/reproducing surface that is farther from a light source than a selected recording/reproducing surface by using light having an intensity that is increased by 4–20% more than a light intensity, Pr, used where recording or reproducing data on a selected recording/reproducing surface among recording/reproducing surfaces excluding the plurality of data recording/reproducing surfaces closest to the light source.

It is preferable that data recording or reproducing on the selected data recording/reproducing surface is performed by using light which is incident on a side of the optical recording medium, or by using light emitted from one of two light sources selected from light sources included at both sides of the optical recording medium.

In a case of using the optical recording medium according to the present invention, diminishing of data recording and reproducing properties on a selected recording/reproducing surface can be prevented by a recording/reproducing surface that is closer than a selected surface to a light source when recording data on a surface selected from a plurality of recording/reproducing surfaces or reading and reproducing the recorded data.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1A:
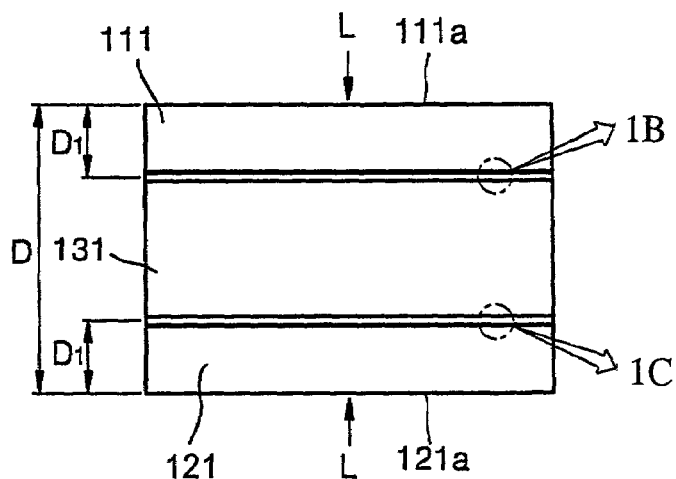
FIG. 1A is a partial sectional view of a conventional high-density optical recording medium.
Figure 1B:
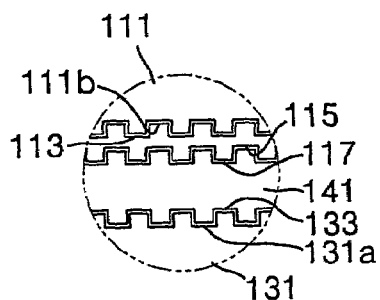
FIG. 1B is a detailed view of a first portion of FIG. 1A.
Figure 1C:
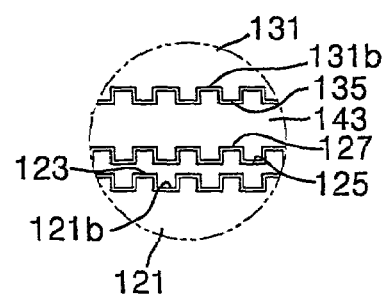
FIG. 1C is a detailed view of a second portion of FIG. 1A.

Reference will now be made in detail to the present embodiments of the present invention, examples of which are illustrated in the accompanying drawings, wherein like reference numerals refer to like elements throughout. In the drawings, thicknesses of layers and areas are exaggerated for clarity.

Figure 2:
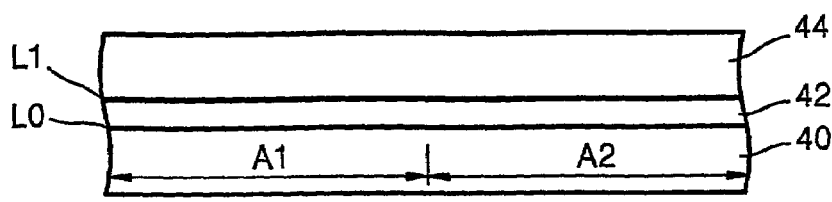
FIG. 2 is a sectional view of an exemplary optical recording medium according to the present invention.

An optical recording medium having a structure shown in FIG. 2, for example, a digital versatile disc (DVD), was prepared as an experiment for implementing an optical recording medium for high-density recording and a method of recording data on the optical recording medium of the present invention.

The optical recording medium shown in FIG. 2 comprises first and second spacer layers 42 and 44 which are sequentially formed on a substrate 40, a first data recording/reproducing surface L0 which is formed between the substrate 40 and the first spacer layer 42, and a second data recording/reproducing surface L1 which is formed between the first and second spacer layers 42 and 44. The substrate 40 is the same type of substrate used in a conventional optical recording medium such as a compact disc (CD) or DVD.

The experimental example of FIG. 2 illustrates both sides of a two sided optical recording medium. For example, reference numerals 40 and 44 denote lower and upper information substrates, respectively, forming a 1.2 mm thick DVD, and reference numeral 42 is a bonding layer to bond the lower and upper information substrates so that the first data recording/reproducing surface L0 faces the second data recording/reproducing surface L1. The bonding layer 42 may be a translucent material layer or an opaque material layer according to an expected direction of light for data recording/reproducing.

Figure 3:
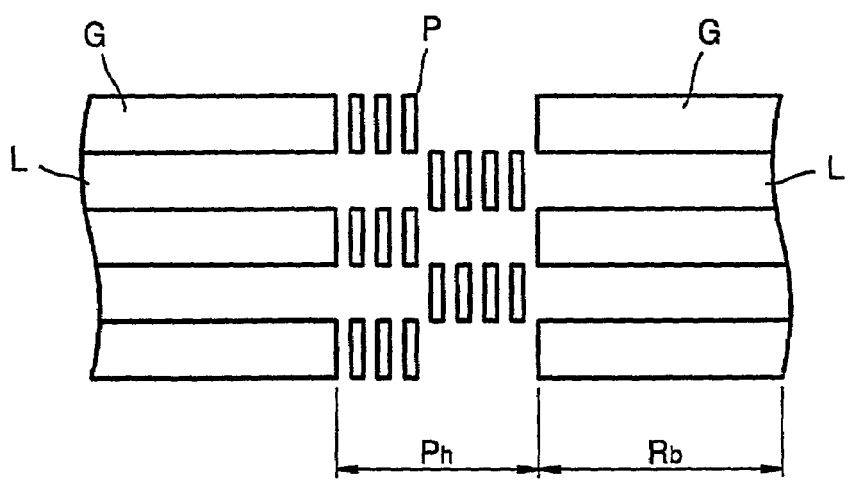
FIG. 3 is a plan view of an area including a head portion on a first data recording/reproducing surface of the optical recording medium of FIG. 2.

The first data recording/reproducing surface L0 is formed of first and second areas A1 and A2. Each of the first area A1 and the second area A2 is an area selected from one of a mirror area at which a pattern is not formed, a pit area at which a pit is formed, and a land/groove area. Thus, the first and second areas A1 and A2 may both be mirror areas, a mirror area and a pit area, areas at which only pits or grooves are formed, or areas at which both pits and grooves exist. As shown in FIG. 3, a head portion $P_h$, which is formed of at least one pit P, may be included to record or reproduce data in a basic recording unit $R_b$. In FIG. 3, reference numerals G and L denote a groove and a land, respectively.

Figure 4:
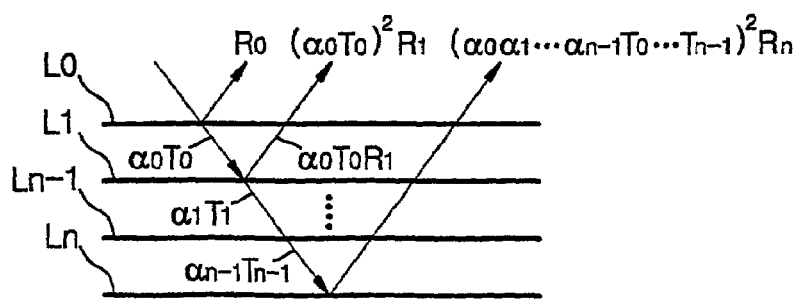
FIG. 4 is a sectional view of the optical recording medium of FIG. 2 including a number n of data recording/reproducing surfaces having a spacer between first and second data recording/reproducing surfaces.

After preparing the optical recording medium, in order to check the effects of the first spacer layer 42 on light which is used for recording data on the second data recording/reproducing surface L1 or where light is used for reading recorded data, a model which is formed of a number n of data recording/reproducing surfaces L0, L1, . . . , Ln-1, and Ln is prepared, as shown in FIG. 4. In FIG. 4, $R_0$, $R_1$, . . . , and $R_n$ denote light reflectances, that is, the quantity of reflected light, of the n-th of data recording/reproducing surfaces L0, L1, . . . , Ln-1, and Ln, respectively. Light transmittance is denoted by $\alpha_0 T_0$, $\alpha_1 T_1$, . . . , $\alpha_{n-1} T_{n-1}$, and $\alpha_n T_n$, that is, the quantity of transmitted light, of the n-th of data recording/reproducing surfaces L0, L1, . . . , Ln-1, and Ln, respectively. Here, $\alpha_0$, $\alpha_1$, . . . , $\alpha_{n-1}$, and $\alpha_n$ denote transmission coefficients of the data recording/reproducing surfaces L0, L1, . . . , Ln-1, and Ln, respectively. The first data recording/reproducing surface L0 having a physical structure, such as a plane with mirror-like properties, a pit, a groove, or a groove having a pit, and having a 30 μm defocus is simulated to obtain the quantity of transmitted light, which then is compared with actual measured results for a first data recording/reproducing surface having the same physical structure. The quantity of transmitted light is calculated by considering a number of tracks of the first data recording/reproducing surface L0 which is exposed to light forming a spot on the second data recording/reproducing surface L1 (for example, more than 60 tracks in a case where numerical aperture (NA) of the first data recording/reproducing surface L0 is 0.6) in the simulation. Actually, decreases in the quantity of light reflected from the second data recording/reproducing surface L1 are measured for three cases: a case where the first data recording/reproducing surface L0 is a plane with mirror-like properties on which a pattern is not formed on the first data recording/reproducing surface L0, a case where a pit is formed on the first data recording/reproducing surface L0, and a case where a groove is formed on the first data recording/reproducing surface L0. This means that a decrease in the quantity of light by the first data recording/reproducing surface L0 is measured. In this measurement, a mirror substrate formed of a reflective layer is used as the second data recording/reproducing surface L1 on which a spot of light is formed, and a layer is not formed on an incident surface, which is the first data recording/reproducing surface L0, in order to measure effects of the physical structure of the first data recording/reproducing surface L0.

Figure 5:
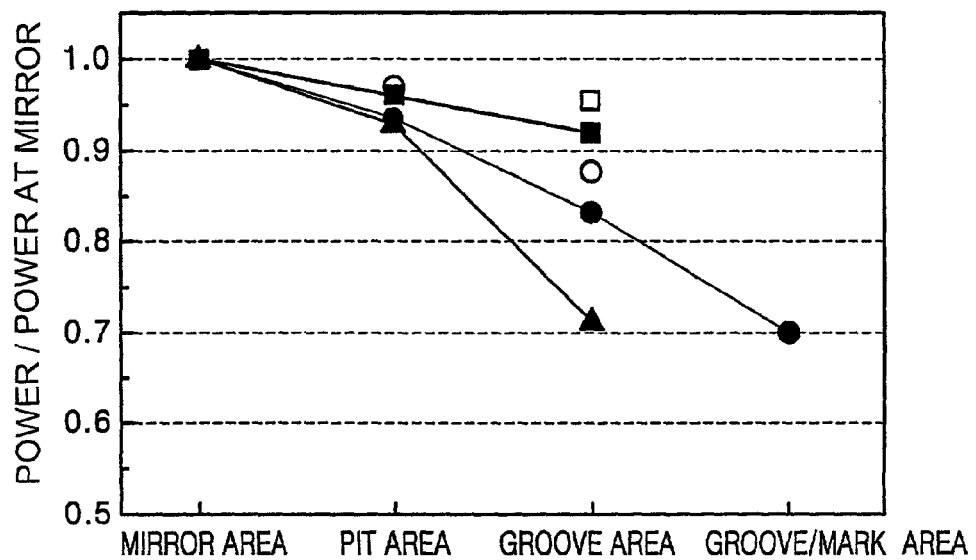
FIG. 5 is a graph showing a comparison of simulated results with measured results in an experimental example of the present invention.
Figure 6:
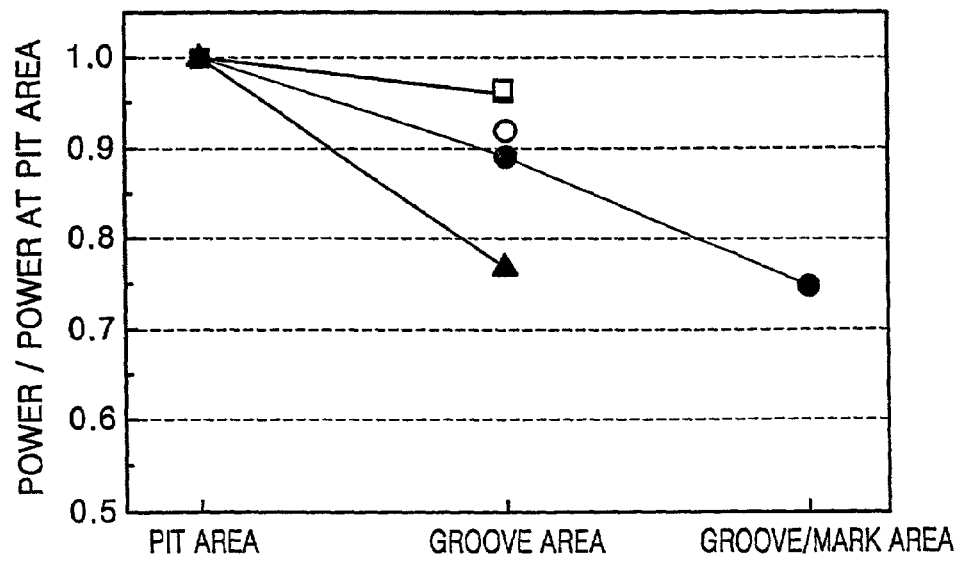
FIG. 6 is a graph showing a comparison of simulated results with measured results in the experimental example of the present invention.
Figure 7:
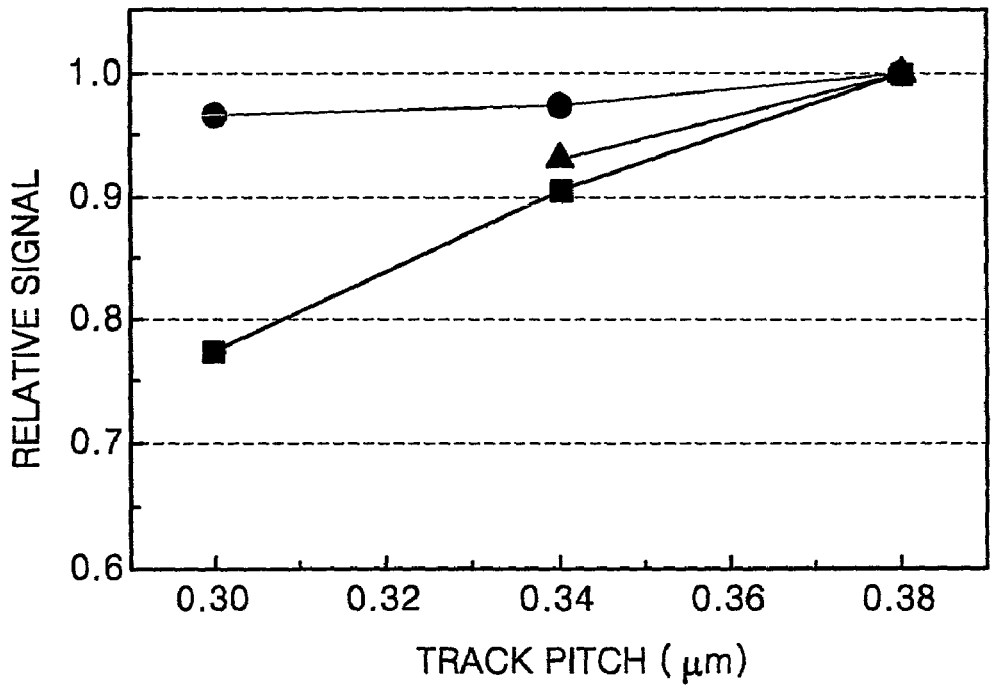
FIG. 7 is a graph showing a comparison of simulated results with measured results in the experimental example of the present invention.

Comparisons of this simulation with the measured results are shown in FIGS. 5, 6 and 7. Basic parameters used in the simulation and the measurement are shown in Table 1.

TABLE 1

| Parameters | Values |
|---|---|
| Wavelength (nm) | 400 |
| Numerical aperture (NA) | 0.65 |
| Minimum mark length (mm) | 0.275 |
| Modulation | EFM+ |
| Track pitch (TP) | 0.30, 0.34, 0.38 |
| Reflection coefficient (%) | Rc = 28, Ra = 10 |

FIG. 5 is a graph showing relationships of the relative quantity of transmitted light at a pit area and a groove area with respect to track pitch based on the quantity of transmitted light at a mirror area of the first data recording/reproducing surface L0. Reference symbols ▲, ●, and ■ denote the simulated results in cases having track pitches of 0.30 μm, 0.34 μm, and 0.38 μm, respectively, and reference symbols ○ and □ denote measured results in cases having track pitches of 0.34 μm and 0.38 μm, respectively.

In the simulated results, the decrease in the quantity of transmitted light passing through the first data recording/reproducing surface L0 is smallest at the mirror area, larger at the pit area, and even larger at the groove area. The smaller the track pitch, the greater the decrease in the quantity of transmitted light. That is, the quantity of light that passes through a specific area of the first data recording/reproducing surface L0, for example, the groove area, is decreased as the track pitch at the groove area becomes smaller. However, the amount of decrease in the quantity of transmitted light at the groove area is larger than at the pit area. For example, the quantity of transmitted light at the pit area is decreased about 4–7.5% more than the quantity of transmitted light at the mirror area, according to the track pitch. However, the quantity of transmitted light at the groove area is decreased 7.5–28.5%. In the simulation, only a difference in reflectances between the mark and the land/groove at the area where a mark exists on a groove is considered. A difference in reflectances due to a difference in absorption between an amorphous mark and a crystalline mark is not considered in the simulation.

Subsequently, in the measured results, the quantity of transmitted light at the pit area is measured based on a track pitch of 0.38 μm, and the decrease in the quantity of transmitted light is about 4% more than in the mirror area. Thus, there is no difference between the simulated results and the measured results for a pit area.

Meanwhile, the decrease in the quantity of transmitted light at the groove area for the measured results is smaller than for the simulated results. These results are shown in the simulation. That is, an angle of a sidewall for connecting the land area to the groove area is perpendicular in the simulation. However, the angle of an actual side wall is 60° and where the angle of the side wall is 60°, the quantity of transmitted light is about 3% more than the case where the sidewall is 90°. Likewise, one reason why the simulated results are different from the measured results is that the parameters of simulation are different from those of the measurement, and the simulated results can be made to be consistent with the measured results by adjusting the parameters.

FIG. 6 is a graph showing a relationship of a relative quantity of transmitted light at a groove area with respect to track pitch based on a quantity of transmitted light at a pit area of the first data recording/reproducing surface L0. Variations in the quantity of transmitted light at the groove area are similar to variation in the quantity of transmitted light at the mirror area. Variations in the track pitch for each reference diagram are the same as in FIG. 5.

FIG. 7 is a graph comparing simulated results with measured results of a quantity of transmitted light with respect to a track pitch at the groove and pit areas. The results are normalized relative to values obtained in a case where the track pitch is 0.38 μm. In FIG. 7, reference symbol ■ denotes a relative quantity of transmitted light at a groove area according to simulated results, symbol ▲ denotes a relative quantity of transmitted light at a groove area according to measured results, and symbol ● denotes a simulated quantity of transmitted light at a pit area.

Referring to FIG. 7, in the simulation, the quantity of transmitted light at the pit area becomes smaller as the track pitch at the pit area is decreased, and in case of a track pitch of 0.38 μm (actually, 0.38 μm×2, because the distance between different line pits in the head portion is double the track pitch) versus a track pitch of 0.34 μm (0.34 μm×2 for the same reason), the quantity of transmitted light at the pit area is decreased by about 4%. However, in case of a header structure, the decreased quantity becomes smaller.

Meanwhile, in case of track pitches of 0.34 μm and 0.30 μm at the groove area, the quantity of transmitted light is decreased by about 9.5% and 22%, respectively, according to the simulated results (■). However, for measured results (▲), in case of a track pitch of 0.34 μm, the quantity of transmitted light is decreased to about 7.5%.

Thus, assuming that the track pitch is 0.30 μm and the numerical aperture is 0.85 for implementation of a high-density optical recording medium, it is preferable that light for recording data or for reading data from the second data recording/reproducing surface surface L1 has an intensity increased by at least 4–20% above an intensity used for recording data or reading data recorded on the first data recording/reproducing surface L0.

Likewise, in the method of recording and reproducing data on the optical recording medium according to the present invention, data may be read or recorded on the second data recording/reproducing surface L1 without being affected by the physical structure of the first data recording/reproducing surface L0 by using light having intensity increased to a predetermined amount more than the intensity of light in the first data recording/reproducing surface L0 when recording data on the second data recording/reproducing surface L1 or reading the recorded data.

These results are applicable to a broad range of optical recording media having a plurality of data recording/reproducing surfaces comprising a number n of data recording/reproducing surfaces (n≧2), such as for example, an optical magnetic disc, a phase change disc like a DVD RW or CD-RW, a recording disc (CD-R), or a reproducing disc, as well in an optical recording medium including the first and second data recording/reproducing surfaces L0 and L1.

Figure 8:
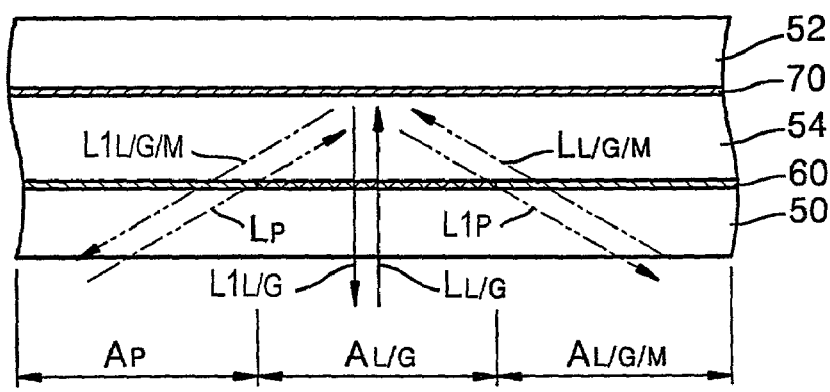
FIG. 8 is a sectional view of the high-density optical recording medium according to another embodiment of the present invention.

FIG. 8 is a sectional view of an optical recording medium, for example, a DVD, according to the present invention. The DVD comprises a first information substrate 50 having a first data recording/reproducing surface 60, a second information substrate 52 having a second data recording/reproducing surface 70, and a translucent bonding layer 54 arranged between the first and second information substrates 50 and 52, for bonding the first and second information substrates 50 and 52 so that the first and second data recording/reproducing surfaces 60 and 70 face each other. The first data recording/reproducing surface 60 includes different areas, for example, a pit area $A_P$, a land/groove area $A_{L/G}$, and a land/groove area $A_{L/G/M}$ at which data are recorded. The second data recording/reproducing surface 70 also has a pit area $A_P$, a land/groove area $A_{L/G}$, and a land/groove area $A_{L/G/M}$ at which data are recorded.

The light reflection properties of the optical recording medium will be described as follows. Referring to FIG. 8, in a case where a spot is formed on a data recording/reproducing surface selected from a plurality of data recording/reproducing surfaces included on the optical recording medium, for example, at a selected area by allowing light to be incident on the second data recording/reproducing surface 70, the light is defocused in view of the first data recording/reproducing surface 60, and the pit area $A_P$, the land/groove area $A_{L/G}$, and the land/groove area $A_{L/G/M}$ at which data are recorded, of the first data recording/reproducing surface 60, are exposed to the light. As a result, all light $L_P$, $L_{L/G}$, and $L_{L/G/M}$ passing through the pit area $A_P$, the land/groove area $A_{L/G}$, and the land/groove area $A_{L/G/M}$, at which data are recorded on the first data recording/reproducing surface 60, is incident on the selected area of the second data recording/reproducing surface 70. Since properties of the areas are different, light transmittance at the areas are also different. Thus, the quantity of light of all light $L1_P$, $L1_{L/G}$, and $L1_{L/G/M}$ reflected from the selected area of the second data recording/reproducing surface 70 is varied. That is, reflectances of the light $L1_P$, $L1_{L/G}$, and $L1_{L/G/M}$ are varied. The selected area is a pit area, a land/groove area, or a land/groove area at which data are recorded.

Where reflectances at the selected area of the second data recording/reproducing surface 60 of the light $L_P$, $L_{L/G}$, and $L_{L/G/M}$ passing through the pit area $A_P$, the land/groove area $A_{L/G}$, and the land/groove area $A_{L/G/M}$ at which data are recorded on the first data recording/reproducing surface 60 are represented as r1, r2, and r3, respectively, the reflectances satisfy the expressions: r1≧r2≧r3 and {(r1−r3)/r1}≧0.2.

The first and second data recording/reproducing surfaces 60 and 70 are each shown as a single layer but may both be double layers with a spacer layer included between the first and second data recording/reproducing surfaces 60 and 70. The double layers have at least the two data recording/reproducing surfaces. Here, the reflection coefficient at the selected area of a layer selected from the layers of the double layer satisfies the expressions r1≧r2≧r3 and {(r1−r3)/r1}≧0.2. Only a data recording/reproducing surface included on an area closest to a light source is excluded from the selected layer.

Where light sources for recording and reproducing data are provided at both sides of the first and second information substrates 50 and 52, respectively, the bonding layer 54 is preferably an opaque material. Here, the first and second data recording/reproducing surfaces 60 and 70 may be double layers, and preferably, the light reflectance at a selected area of a layer selected from the double layers excluding the data recording/reproducing surface included on an area closest to each of the light sources has the above properties.

Light intensity resulting from a minimum value of jitter of the optical recording medium having the properties shown in FIG. 8 is about 4.4 mW, and a light intensity margin in which the jitter is decreased to a value of not more than 2% is in the range of ±0.9 mW. Thus, using the expression {(r1−r3)/r1}0.2, the optimum intensity versus the light intensity margin is 0.9/4.4≈0.2.

Although the present invention has been described with reference to a exemplary embodiment, the present invention is not limited to the exemplary embodiment. For example, it will be recognized by a person skilled in the art to which the present invention pertains that data is recordable on a specific recording/reproducing surface, or that recorded data is readable by applying the teachings of the present invention to a new optical recording medium regardless of a physical structure of other recording/reproducing surfaces. Further, a recording method for a data recording/reproducing surface having a physical structure which is not mentioned in the detailed description may be implemented by applying the recording method of the present invention.

As described above, the reflection properties of a surface selected from the plurality of data recording/reproducing surfaces included in the optical recording medium according to the present invention are represented in the expressions r1≧r2≧r3 and {(r1−r3)/r1}0.2, and data are recorded on or reproduced from a recording/reproducing surface including the next selected surface using light having an intensity increased more than the intensity used at the selected surface. Thus, reduction of data recording and reproducing properties on the selected recording/reproducing surface can be prevented due to the recording/reproducing surface nearer the light source than the selected surface where data are recorded on a surface selected from the plurality of recording/reproducing surfaces, or the recorded data are read and reproduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording and/or reproducing data on an optical recording medium having a plurality of data recording/reproducing surfaces, the method comprising:

recording data on or reproducing data from a recording/reproducing surface that is farther from a light source than a selected recording/reproducing surface by using light having an intensity that is increased by 4–20% more than a light intensity, Pr, used where recording or reproducing data on/from the selected recording/reproducing surface among the plurality of recording/reproducing surfaces.

2. The method as claimed in claim 1, wherein the recording or reproducing on the selected data recording/reproducing surface is performed by using light having the intensity Pr which is incident on a side of the optical recording medium.

3. The method as claimed in claim 1, wherein the recording or reproducing on the selected data recording/reproducing surface is performed by using light having the intensity Pr emitted from one of two light sources included at opposite sides of the optical recording medium.

4. A method of recording data on an optical recording medium having a plurality of data recording surfaces, the method comprising:

recording first data on a first recording surface that is farther from a light source than a second recording surface by using light having a light intensity that is 4–20% greater than a light intensity used to record second data on the second recording surface, wherein the recording is performed after completion of manufacture of the optical recording medium having the plurality of data recording surfaces.

5. A method of reproducing information from an optical recording medium having a plurality of data recording surfaces, the method comprising:

reproducing first data from a first recording surface that is farther from a light source than a second recording surface by using light having a light intensity that is 4–20% greater than a light intensity used to reproduce second data from the second recording surface, wherein:

the first data to be reproduced is recorded after completion of the manufacture of the optical recording medium having the plurality of data recording surfaces by using light having a light intensity that is 4–20% greater than a light intensity used to record the second data on the second recording surface.

\* \* \* \* \*